(12) United States Patent
Patiño et al.

(10) Patent No.: US 10,829,701 B2
(45) Date of Patent: *Nov. 10, 2020

(54) NANOCATALYSTS FOR HYDROCRACKING AND METHODS OF THEIR USE

(71) Applicant: Petroraza SAS, Antioquia (CO)

(72) Inventors: Jose Edgar Patiño, Antioquia (CO); Farid Bernardo Cortés, Medellin (CO)

(73) Assignee: Petroraza SAS, Antioquia (CO)

( * ) Notice: Subject to any disclaimer, the term of this patent is extended or adjusted under 35 U.S.C. 154(b) by 7 days.

This patent is subject to a terminal disclaimer.

(21) Appl. No.: 16/404,267

(22) Filed: May 6, 2019

(65) Prior Publication Data

US 2019/0256785 A1    Aug. 22, 2019

Related U.S. Application Data

(63) Continuation of application No. 15/962,805, filed on Apr. 25, 2018, now Pat. No. 10,301,555, which is a continuation of application No. 15/155,413, filed on May 16, 2016, now abandoned, which is a continuation of application No. 13/896,578, filed on May 17, 2013, now Pat. No. 9,339,796.

(60) Provisional application No. 61/655,576, filed on Jun. 5, 2012.

(51) Int. Cl.
| | | |
|---|---|---|
| *C10G 49/04* | (2006.01) | |
| *B01J 35/00* | (2006.01) | |
| *B01J 23/755* | (2006.01) | |
| *B01J 23/89* | (2006.01) | |
| *E21B 43/00* | (2006.01) | |
| *B01J 35/02* | (2006.01) | |
| *B01J 23/78* | (2006.01) | |
| *B01J 37/02* | (2006.01) | |
| *B01J 21/04* | (2006.01) | |
| *B01J 35/10* | (2006.01) | |
| *C10G 1/08* | (2006.01) | |
| *C10G 11/02* | (2006.01) | |
| *C10G 11/04* | (2006.01) | |

(52) U.S. Cl.
CPC .............. *C10G 49/04* (2013.01); *B01J 21/04* (2013.01); *B01J 23/755* (2013.01); *B01J 23/78* (2013.01); *B01J 23/892* (2013.01); *B01J 23/8946* (2013.01); *B01J 35/002* (2013.01); *B01J 35/006* (2013.01); *B01J 35/0013* (2013.01); *B01J 35/023* (2013.01); *B01J 35/1014* (2013.01); *B01J 37/0201* (2013.01); *B01J 37/0207* (2013.01); *C10G 1/08* (2013.01); *C10G 11/02* (2013.01); *C10G 11/04* (2013.01); *E21B 43/00* (2013.01); *C10G 2300/4037* (2013.01)

(58) Field of Classification Search
CPC ........ B01J 21/04; B01J 23/755; B01J 23/892; B01J 35/002; B01J 35/006; B01J 35/023; B01J 35/0013; C10G 49/04
See application file for complete search history.

(56) References Cited

U.S. PATENT DOCUMENTS

| | | | | |
|---|---|---|---|---|
| 2,926,130 | A * | 2/1960 | Hogan | ................... C10G 47/00 |
| | | | | 208/110 |
| 4,720,477 | A * | 1/1988 | Hettinger, Jr. | ........... B01J 23/88 |
| | | | | 204/157.42 |
| 2012/0083643 | A1 * | 4/2012 | Rashidi | ................ B01J 37/0203 |
| | | | | 585/855 |

* cited by examiner

*Primary Examiner* — Renee Robinson

(57) ABSTRACT

Novel catalysts comprising nickel oxide nanoparticles supported on alumina nanoparticles, methods of their manufacture, heavy oil compositions contacted by these nanocatalysts and methods of their use are disclosed. The novel nanocatalysts are useful, inter alia, in the upgrading of heavy oil fractions or as aids in oil recovery from well reservoirs or downstream processing.

22 Claims, 9 Drawing Sheets

NANOCATALYSTS FOR HYDROCRACKING AND METHODS OF THEIR USE

CROSS REFERENCE TO RELATED APPLICATIONS

This application is a continuation of pending U.S. application Ser. No. 15/962,805, filed Apr. 25, 2018, now allowed, which is a continuation of pending U.S. application Ser. No. 15/155,413, filed May 16, 2016, now abandoned, which is a continuation of U.S. application Ser. No. 13/896,578, issued as U.S. Pat. No. 9,339,796 on May 17, 2016, which claims the benefit of U.S. Provisional Application Ser. No. 61/655,576 filed Jun. 5, 2012, the disclosure of each of which is hereby incorporated herein by reference in its entirety.

FIELD OF THE INVENTION

The present invention relates to a new class of supported nanocatalysts that upgrade heavy oil fractions, processes for their preparation, and methods of their use, and products prepared by contacting heavy oil fractions with the nanocatalysts. More particularly, this invention relates to catalysts comprising nickel oxide nanoparticles supported on alumina nanoparticles with improved asphaltene sorption properties that enhance thermal catalytic cracking of heavy oils within an oil reservoir or during downstream processing.

BACKGROUND OF THE INVENTION

As industrialization expands globally to include an ever enlarging list of countries, demand for oil as an energy source and as feedstock for the myriad of petroleum based products enjoyed by consumers necessarily increases. This demand puts pressure on high quality or readily obtainable oil supplies, and can result in shortages and cost increases. While additional lower quality oil reserves such as heavy oils and bitumen are in abundant supply in Canada, Venezuela and the United States, for example, they generally contain higher levels of high boiling components and/or higher concentrations of impurities such as sulfur, nitrogen or metals. The high boiling fractions typically have a high molecular weight and/or low hydrogen/carbon ratio, an example of which is a class of complex compounds collectively referred to as "asphaltenes". Asphaltenes are difficult to process and commonly cause fouling of conventional catalysts and hydroprocessing equipment. These lower quality feedstocks are further characterized as including relatively high quantities of hydrocarbons that have a boiling point of 524° C. (975° F.) or higher. They are typically less attractive to oil producers because they require more expensive processing to break down the high boilers or remove or reduce impurities to acceptable commercial levels that would allow them to effectively compete with light crude. Other examples of lower quality feedstocks that contain relatively high concentrations of asphaltenes, sulfur, nitrogen and metals include bottom of the barrel and residuum left over from conventional refinery processes (collectively "heavy oil").

Shortages and/or price increases in high quality oils help to level the playing field and compensate for any increased costs of heavy oil processing, permitting lower quality oil reserves to become attractive alternatives to light crude. To better compare to light crude, a refiner must modify a number of properties in heavy oils. In contrast to high quality oils, heavy oils and bitumen are typically characterized by having low specific gravities (0-18.degree. API), high viscosities (>100,000 cp), and high sulfur content (e.g., >5% by weight). Converting heavy oil into useful end products requires extensive processing, including reducing the boiling point of the heavy oil, increasing the hydrogen-to-carbon ratio, and/or removing impurities such as metals, sulfur, nitrogen and high carbon forming compounds. Langdon et al. (U.S. Pat. No. 7,712,528) describes certain heavy oil processing methods generally as well as identifies their shortcomings and the impact of high concentrations of asphaltenes on processing efficiencies.

Other processes reported to hydrocrack heavy oils include those disclosed by Lott et al. (U.S. Published Application No. 2011/0220553) that is said to disclose methods and systems for hydrocracking a heavy oil feedstock using an in situ colloidal or molecular catalyst. The invention reportedly involves methods and systems for hydroprocessing heavy oil feedstocks that include a significant quantity of asphaltenes and fractions boiling above 524° C. (975° F.) to yield lower boiling, higher quality materials and relate to ebullated bed hydroprocessing methods and systems that employ a colloidal or molecular catalyst and a porous supported catalyst.

To generally reduce the viscosity of oil, the industry has relied on various thermal and catalytic cracking processes. Pyrolysis, or "thermal cracking", typically occurs when oil cracks at temperatures greater than about 650° F. Pyrolysis tends to improve certain heavy oil properties by reducing viscosity and API gravity but may also lead to increased content of acids. By its very nature, thermal cracking generally has minimal effect on total sulfur content. The result is a feedstock that is intrinsically less valuable to downstream processors. Moreover, the high temperatures required increase the likelihood of coke formation which leads to fouling of refinery equipment or catalysts used by refiners to further process the oil into saleable products. Commercial solutions to these problems include carbon removal or hydrogenation, but costs for these processes must be borne by the refiners. A number of catalysts, including supported nickel catalysts, are available to hydrogenate or hydrotreat oils, but they are typically used in downstream processing. Improvements in nickel-based catalysts may lead to improved efficiencies in these downstream processes, thereby reducing costs and/or increasing product output. A number of processes to prepare certain supported catalysts for use in hydrotreating or hydrogenating various oils are known.

For example, one technique commonly used to obtain supported nickel catalysts starts with the nickel atoms dissolved in a solvent. The nickel atoms are usually provided as nickel salts due to the solubility of nickel salts in various solvents. The support material is added to the nickel solution and the nickel is then precipitated onto the support, typically by adding a base. The supported nickel catalyst is then dried and calcined (e.g., at 375° C.) and activated by reduction with hydrogen.

It is known in the art that heating and/or calcining the catalyst atoms causes agglomeration of catalyst particles to some degree. See Reyes et al., (U.S. Pat. No. 7,563,742). Agglomeration is undesired because it reduces the performance of the catalyst. Agglomerated particles have less exposed surface area and are consequently less active for a given amount of metal (i.e., only the exposed metal atoms on the surface are available for catalysis). Despite the undesirability of agglomeration, exposing the catalyst to heat is often necessary to activate the catalyst or for carrying out the reactions that involve the catalyst.

The extent of agglomeration during manufacture or use of the catalyst typically depends on the size and number of catalyst particles. Smaller particles are more likely to agglomerate because of higher surface tension as compared to larger particles. Higher metal loading also tends to facilitate agglomeration because the particles are in closer proximity. Although catalyst performance can in theory be increased with smaller catalyst particles, improvement in catalyst performance has been somewhat limited by the inability to beneficially increase metal loading while using small catalyst particles.

Reyes et al. (U.S. Pat. No. 7,563,742) discloses certain supported nickel nanocatalysts having high nickel loadings and methods for their preparation. These catalysts are reportedly useful, inter alia, for hydrocracking, hydrodesulfurization and other similar processes carried out in refinery settings.

Langdon et al. (U.S. Pat. No. 7,712,528) discloses some methods for dispersing nanocatalysts into petroleum bearing formations, forming lighter oil products within the formation, and extracting the lighter oil components from the formation. Processes for the in situ conversion and recovery of heavy crude oils and natural bitumens from subsurface formations are described therein.

Toledo Antonio, et al. (U.S. Pat. No. 7,981,275) reports certain catalytic compositions having a high specific activity in reactions involving hydroprocessing of light and intermediate petroleum fractions, and preferably in hydrodesulphurization and hydrodenitrogenation reactions, employing a catalyst containing at least one element of a non-noble metal from group VIII, at least one element from group VIB and, optionally, a group one element of the VA group, which are deposited on a catalytic support comprising of an inorganic metal oxide from group IVB.

Wong, et al. (U.S. Pat. No. 7,825,064) describes some catalytic materials, and more particularly, catalysts composed of metal oxide on which is supported another metal oxide wherein the support comprises nanometer-sized metal oxide particles.

Espinoza et al. (U.S. Pat. No. 7,323,100) discloses certain combination of amorphous materials for use in hydrocracking catalysts.

Park et al. (Published U.S. Application No. 2011/0172417) describes some heterogeneous copper nanocatalysts and methods of their preparation composed of copper nanoparticles on boehmite.

Bhattacharyya et al. (Published U.S. Application No. 2011/0306490) discloses certain compositions of supported molybdenum catalyst for converting heavy hydrocarbon feed into lighter hydrocarbon products. The support reported is boehmite or pseudo-boehmite and may further contain iron oxide.

Supported catalysts, especially nanocatalysts that maintain or improve catalytic cracking efficiency while requiring lower metal loadings, remain desirable yet elusive targets of the industry. Alternatives employing catalysts that could combine easier recovery of heavy oils from oil bearing formations and improve oil properties would be attractive to oil suppliers and refiners alike. Catalysts and methods of their use for hydroprocessing heavy oil feedstocks that include a significant quantity of asphaltenes and fractions boiling above 570° C. (1,058° F.) to yield lower boiling, higher quality materials are also desirable. Catalysts and methods of their use that, by their use in treat heavy oils in formation and recovery, extend the useful life of expensive equipment used to extract or further process the upgraded heavy oil fractions would be of commercial interest. The invention is related to these and other important ends.

SUMMARY OF THE INVENTION

Accordingly, the present invention is directed, in part, to catalysts comprising:
nickel oxide nanoparticles supported on alumina nanoparticles;
wherein the alumina nanoparticle to nickel oxide nanoparticle weight to weight ratio in the catalyst is in a range of from about 80 to about 500.

In other embodiments, the present invention is directed to processes for preparing a catalyst comprising:
nickel oxide nanoparticles supported on alumina nanoparticles;
wherein the alumina nanoparticle to nickel oxide nanoparticle weight to weight ratio in the catalyst is in a range of from about 80 to about 500;
said process comprising:
dry impregnating an amorphous dried sodium aluminate precipitate with an aqueous solution of a water-soluble nickel salt; and
drying the nickel impregnated precipitate;
wherein the dry impregnating and drying steps are each carried out for a time and under conditions sufficient to provide the nickel impregnated precipitate catalyst.

In yet other embodiments, the present invention is directed to catalysts prepared by the processes for preparing a catalyst described herein.

In still other embodiments, the present invention is directed to methods for upgrading heavy oil fractions in a well, comprising:
contacting the heavy oil in a well producing heavy oil with a catalyst according to the invention for a time and under conditions sufficient to increase the H/C ratio.

In yet other embodiments, the present invention is directed to upgraded heavy oil fractions prepared by the processes for upgrading heavy oil fractions described herein.

The foregoing and other objectives, features, and advantages of the invention will be more readily understood upon consideration of the following detailed description of the invention.

DETAILED DESCRIPTION OF ILLUSTRATIVE EMBODIMENTS

Figure 1:
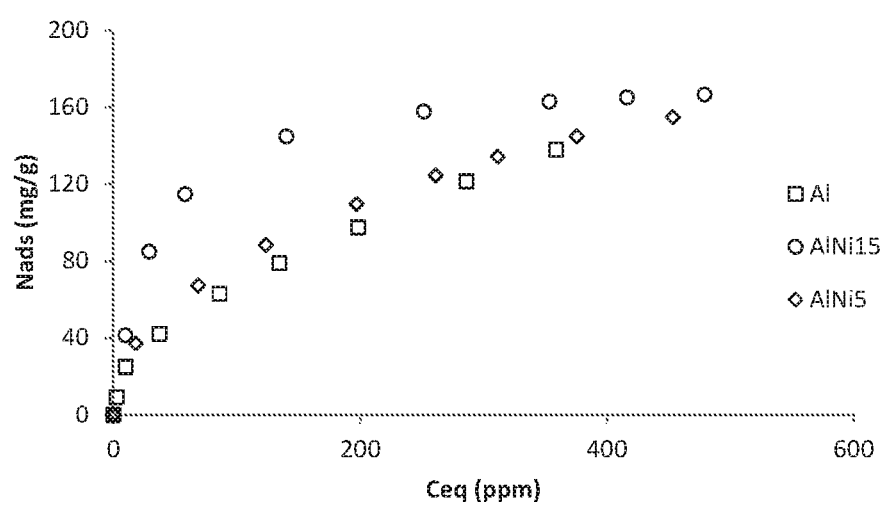
FIG. 1 shows the asphaltene sorption isotherms at 25° C. for an alumina nanoparticle support as disclosed and certain alumina nanoparticle catalysts according to the present invention having different nickel oxide nanoparticle loadings.
Figure 2:
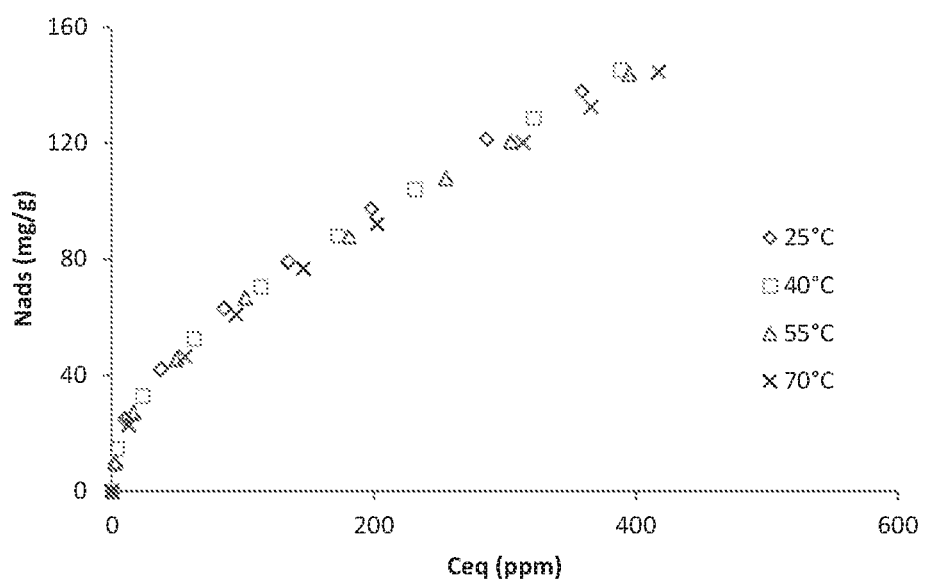
FIG. 2 shows the asphaltene sorption isotherm at a variety of temperatures for an alumina nanoparticle support as disclosed.
Figure 3:
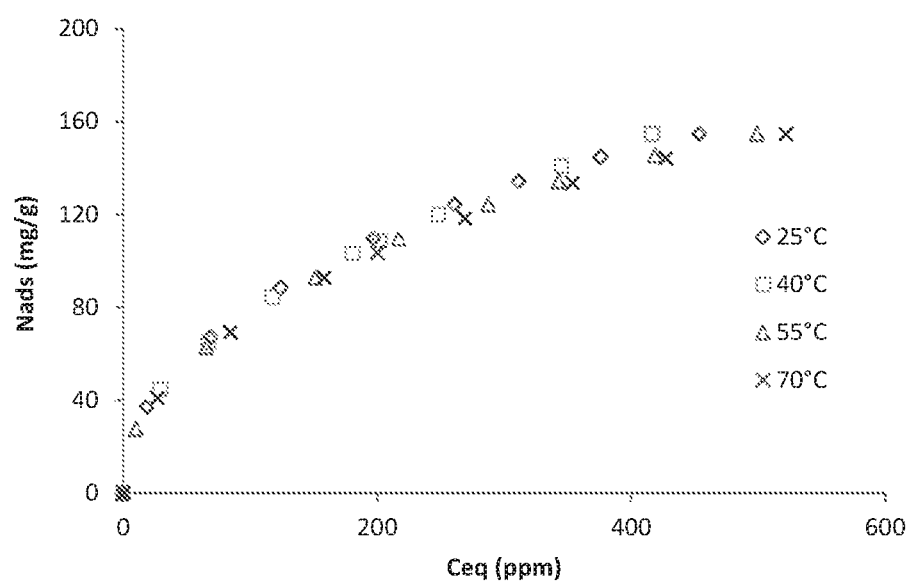
FIG. 3 shows the asphaltene sorption isotherm at a variety of temperatures for an alumina nanoparticle catalyst according to the present invention having a nickel oxide nanoparticle loading (AlNi (5%)).
Figure 4:
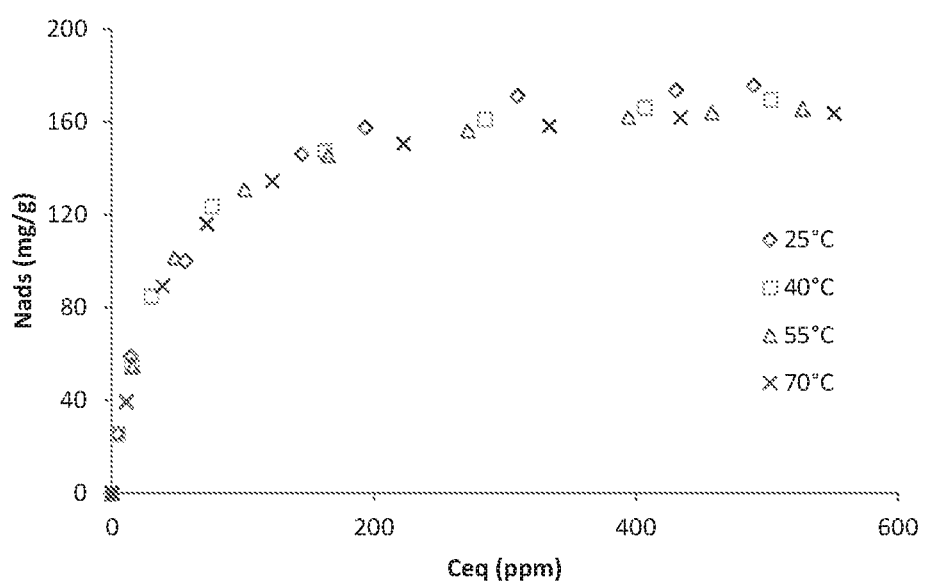
FIG. 4 shows the asphaltene sorption isotherm at a variety of temperatures for an alumina nanoparticle catalyst according to the present invention having a nickel oxide nanoparticle loading (AlNi (15%)).

As employed above and throughout the disclosure of the present invention, the following terms, unless otherwise indicated, shall be understood to have the following meanings.

As used herein, the term "activated alumina" refers to materials manufactured from aluminum hydroxide by dehydroxylating it in a way that produces a highly porous material; which can have a surface area significantly over 200 square meters/gram.

As used herein the term "refractory material" refers to a material that retains its strength at high temperatures. ASTM C71 defines refractories as "non-metallic materials having those chemical and physical properties that make them applicable for structures, or as components of systems, that are exposed to environments above 1,000° F. Refractory materials must be chemically and physically stable at high temperatures. Depending on the operating environment, they need to be resistant to thermal shock, be chemically inert, and/or have specific ranges of thermal conductivity and of the coefficient of thermal expansion. The oxides of aluminum (alumina), silicon (silica) and magnesium (magnesia) are the most important materials used in the manufacturing of refractories. Another oxide usually found in refractories is the oxide of calcium (lime). Fire clays are also widely used in the manufacture of refractories. Refractories must be chosen according to the conditions they will face. Some applications require special refractory materials. Zirconia is used when the material must withstand extremely high temperatures. Silicon carbide and carbon (graphite) are two other refractory materials used in some very severe temperature conditions, but they cannot be used in contact with oxygen, as they will oxidize and burn.

As used herein, the term "nanoparticle" refers to fine particles having a particle size of less than or equal to 100 nanometers (i.e., less than or equal to 0.1 μm)

As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

This invention is directed to, inter alia, the surprising and unexpected discovery of a new class of supported nanocatalysts that upgrade heavy oil fractions, processes for their preparation, and methods of their use, and products prepared by contacting heavy oil fractions with the nanocatalysts. More particularly, this invention relates to catalysts comprising nickel oxide nanoparticles supported on alumina nanoparticles with improved asphaltene sorption properties that enhance thermal catalytic cracking of heavy oils within an oil reservoir or during downstream processing.

Among the methods that may be employed for measuring nickel oxide (NiO) on the final catalyst are hydrogen adsorption, atomic absorption and certain gravimetric method. However, hydrogen adsorption is the most accurate method because it identifies active sites on the surface of the support material which are the sites having NiO content. Atomic absorption spectrometry (AAS): is the well-known methodology in which radiant energy is emitted from a hollow cathode lamp and passed through a flame. Each atomic element energy band is very narrow and is easily distinguished from the other atomic absorption lines of other elements. Gravimetric methods are very simple in their nature and much less accurate. They estimate the difference in weight before and after impregnation of dry material.

The term "asphaltenes" as used herein refers to the fraction of oil, bitumen or vacuum residue that is insoluble in low molecular weight paraffins such as n-heptane or n-pentane, while being soluble in light aromatic hydrocarbons such as toluene, pyridine or benzene.

Benefits of the catalysts include one or more of the following: improved catalyst tolerance for impurities found in heavy oils; ease of upgrading or hydrocracking the heavy oils, preferably wherein the cracking is carried in the well reservoirs, said oils having increased levels of hydrocracked materials contained therein after contacting with the catalysts and hydrogen transfer agents; reduced levels of impurities such as sulfur; lower reaction temperatures and/or reaction pressures for carrying out the in-situ reactions in the hydrocarbons reservoirs; limited downtimes for wells while the hydrocracking takes place and the like. In certain of the methods employing the catalysts of the invention for use in upgrading heavy oils, the nanocatalyst does not require heat in addition to that experienced in the underground reservoir. Preferably, the catalyst suitably upgrades the heavy oil in a well at temperatures of no higher than 250° F., more preferably at temperatures below 250° F., still more preferably below 240, 220, 200, or even 180° F.

Accordingly, in certain embodiments, the present invention provides catalysts comprising:
nickel oxide nanoparticles supported on alumina nanoparticles;
  wherein the alumina nanoparticle to nickel oxide nanoparticle weight to weight ratio in the catalyst is in a range of from about 80 to about 500, preferably in a range of from about 99 to about 400.

In certain preferred embodiments of the catalysts according to the invention, the nickel oxide (NiO) nanoparticles are present in an amount of about 0.2% to about 1% by weight of catalyst, preferably as measured by hydrogen adsorption.

In other preferred embodiments, the particle size of the nickel oxide nanoparticles or the alumina nanoparticles comprising the catalysts is less than about 0.1 μm, more preferably wherein the particle size of the nickel oxide nanoparticles and the alumina nanoparticles are each less than about 0.1 μm.

In some preferred embodiments, the alumina nanoparticles are present in an amount of at least 99% by weight of catalyst.

In yet other preferred embodiments, the catalysts further comprise nanoparticles of at least one Group VIIIB metal oxide supported on the alumina nanoparticles;
  wherein:
    the Group VIIIB metal is other than nickel, preferably selected from platinum, palladium, and iron, and combinations thereof; and the alumina nanoparticle to Group VIIIB metal oxide nanoparticle weight to weight ratio in the catalyst is in a range of from about 80 to about 500, preferably in a range of from about 99 to about 400.

In certain other preferred embodiments, the catalysts further comprise nanoparticles of at least one Group IB metal supported on the alumina nanoparticles;
wherein:
the alumina nanoparticle to Group IB metal nanoparticle weight to weight ratio in the catalyst is in a range of from about 80 to about 500, preferably in a range of from about 99 to about 400; and wherein the Group IB metal is preferably silver.

In some embodiments, the invention is directed to processes for preparing a catalyst comprising:
nickel oxide nanoparticles supported on alumina nanoparticles;
wherein the alumina nanoparticle to nickel oxide nanoparticle weight to weight ratio in the catalyst is in a range of from about 80 to about 500, preferably in a range of from about 99 to about 400;
said process comprising:
dry impregnating an amorphous dried sodium aluminate precipitate with an aqueous solution of a water-soluble nickel salt; and
drying the nickel impregnated precipitate;
wherein the dry impregnating and drying steps are each carried out for a time and under conditions sufficient to provide the dried nickel impregnated precipitate catalyst.

In certain preferred embodiments, the catalyst or catalyst intermediate is a dried nickel impregnated precipitate prepared by a process disclosed herein.

In certain preferred embodiments, the processes further comprise calcining the dried nickel impregnated precipitate in the presence of oxygen or air;
wherein:
the calcining is carried out for a time and under conditions sufficient to provide the calcined nickel catalyst.

In certain more preferred embodiments, the invention is directed to a calcined dried nickel impregnated precipitate catalyst prepared by a process disclosed herein.

In some other embodiments, the invention is directed to processes for preparing a calcined catalyst, said catalyst comprising:
nickel oxide nanoparticles supported on alumina nanoparticles;
wherein the alumina nanoparticle to nickel oxide nanoparticle weight to weight ratio in the catalyst is in a range of from about 80 to about 500, preferably in a range of from about 99 to about 400; and
nanoparticles of at least one Group VIIIB metal oxide nanoparticles supported on the alumina nanoparticles;
wherein:
the Group VIIIB metal is other than nickel, preferably palladium, platinum or iron, and combinations thereof; and
the alumina nanoparticle to Group VIIIB metal oxide nanoparticle weight to weight ratio in the catalyst is in a range of from about 80 to about 500, preferably in a range of from about 99 to about 400;
said process comprising
dry impregnating an amorphous dried sodium aluminate precipitate with an aqueous solution of a water-soluble nickel salt; and
drying the nickel impregnated precipitate;
wherein the dry impregnating and drying steps are each carried out for a time and under conditions sufficient to provide the dried nickel impregnated precipitate catalyst;
dry impregnating the dried nickel impregnated precipitate with an aqueous solution of a water-soluble Group VIIIB metal salt;
drying the nickel and Group VIIIB metal impregnated precipitate; and
calcining the dried nickel and Group VIIIB metal impregnated precipitate in the presence of oxygen or air;
wherein each of the dry impregnating, drying, and calcining are carried out for a time and under conditions sufficient to provide the calcined nickel and Group VIIIB metal impregnated catalyst.

In certain more preferred embodiments, the invention is directed to a calcined dried nickel and Group VIIIB metal impregnated precipitate catalyst prepared by a process disclosed herein.

In some other embodiments, the invention is directed to processes for preparing a calcined catalyst, said catalyst comprising:
nickel oxide nanoparticles supported on alumina nanoparticles;
wherein the alumina nanoparticle to nickel oxide nanoparticle weight to weight ratio in the catalyst is in a range of from about 80 to about 500, preferably in a range of from about 99 to about 400; and
nanoparticles of at least one Group IB metal oxide nanoparticles supported on the alumina nanoparticles;
wherein:
the Group IB metal is preferably silver; and
the alumina nanoparticle to Group IB metal oxide nanoparticle weight to weight ratio in the catalyst is in a range of from about 80 to about 500, preferably in a range of from about 99 to about 400;
said process comprising
dry impregnating an amorphous dried sodium aluminate precipitate with an aqueous solution of a water-soluble nickel salt; and
drying the nickel impregnated precipitate.
wherein the dry impregnating and drying steps are each carried out for a time and under conditions sufficient to provide the dried nickel impregnated precipitate catalyst;
dry impregnating the dried nickel impregnated precipitate with an aqueous solution of a water-soluble Group IB metal salt;
drying the nickel and Group IB metal impregnated precipitate; and
calcining the dried nickel and Group IB metal impregnated precipitate in the presence of oxygen or air;
wherein each of the dry impregnating, drying, and calcining are carried out for a time and under conditions sufficient to provide the calcined dried nickel and Group IB metal impregnated catalyst.

In certain more preferred embodiments, the invention is directed to a calcined dried nickel and Group IB metal impregnated precipitate catalyst prepared by the process disclosed hereinabove.

In certain preferred embodiments of the present catalyst compositions, processes and methods, the alumina nanoparticles are present in an amount of at least 99% by weight of catalyst as described herein.

Typically, the alumina nanoparticles are derived from aluminum metal or an aluminum containing compound that has been contacted with an aqueous alkaline material such as hydroxide, preferably potassium or sodium hydroxide, more preferably sodium hydroxide. While any aluminum compound capable of dissolution in aqueous base may be employed, in certain preferred embodiments, aluminum metal is used as the aluminum feedstock. In other alternately preferred embodiments, aluminum hydroxide is used. Once the aluminum or aluminum hydroxide is dissolved, it may be precipitated as an amorphous solid by reacidification by adding an acid and monitoring the pH until it is in the range of from about 8 to about 8.5, preferably about 8.5. Preferably, the reacidification may be accomplished by using gaseous $CO_2$ bubbled slowly into the solution, more preferably at room temperature. At this point the acid addition may be terminated and the aluminum precipitate may be isolated, for example, by filtration. The isolated precipitate may be used in the metal impregnation step, preferably by an incipient wetness method of impregnation (also referred to at times as "dry impregnation"), after its drying. In certain instances it is advantageous to wash the precipitate one or more times with water, preferably distilled or deionized water, after isolation to reduce the level of sodium, potassium or other cation associated with the alkaline material prior to the drying step. Once the aluminate precipitate has been dried, it is ready for the dry impregnation step with any of the identified metal salts. It is not necessary to calcine the aluminum precipitate prior to impregnation. In certain instances it is preferred that the aluminum precipitate not be calcined prior to metal impregnation.

In other preferred embodiments, the dried sodium aluminate precipitate is dry impregnated with an aqueous solution of a water-soluble nickel salt by employing the incipient wetness method (IWM). Preferably, the water-soluble nickel salt comprises nickel nitrate, nickel chloride or nickel sulfate, more preferably nickel nitrate. Typically in the IWM, the active metal precursor is dissolved in an aqueous solution. Then the metal-containing solution is added to a catalyst support containing the same pore volume as the volume of solution that was added. Capillary action draws the solution into the pores. The catalyst can then be dried and calcined to drive off the volatile components within the solution, depositing the metal on the catalyst surface. The maximum loading is limited by the solubility of the precursor in the solution. The concentration profile of the impregnated compound depends in the mass transfer conditions within the pores during impregnation and drying. Alternatively, the precipitate may be prepared by any of the processes known to the ordinarily skilled artisan.

To remove any volatiles following impregnation by the incipient wetness method, the precipitate may be dried by heating for a period of time until the volatiles, such as water are removed. In certain preferred embodiments, the, the nickel impregnated precipitate is dried at a temperature in the range of from about 100 to about 140° C. for a time sufficient to remove substantially all of the water from the nickel impregnated precipitate, preferably for from about 3 to about 8 hours. These conditions are generally recognized by the skilled artisan as insufficient to calcine the metal impregnated precipitates of the present invention.

In some other preferred embodiments of the processes described herein, the dried nickel impregnated precipitate is thereafter calcined in the presence of oxygen or air for a time and under conditions sufficient to provide the calcined catalyst. A variety of conditions sufficient to calcine the dried nickel impregnated precipitate are well known to the ordinarily skilled artisan. In certain more preferred embodiments of the present invention, the dried nickel impregnated precipitate is calcined at a temperature in the range of from about 400 to about 500° C. for a time sufficient to calcine the catalyst, preferably for from about 3 to about 8 hours.

In certain alternatively preferred embodiments, the dried nickel impregnated precipitate may then be further impregnated with at least one additional metal salt, preferably one additional metal salt, preferably by the incipient wetness (or dry impregnating method). Preferably the metal further impregnating the nickel impregnated precipitate is a Group VIIIB or Group IB metal salt, preferably dry impregnated, more preferably with a water-soluble Group VIIIB or Group IB metal salt. When the metal is a Group VIIIB metal, it is preferably a water soluble salt of palladium, platinum or iron. When the metal is a Group IB metal, it is preferably a water soluble salt of silver. These water soluble salts may comprise counterions of chloride, sulfate or nitrate, preferably nitrate. To remove any volatiles following impregnation by the incipient wetness method, the multiply metal impregnated precipitate may be dried by heating for a period of time until the volatiles, such as water are removed. In certain preferred embodiments, the multiply metal impregnated precipitate is dried at a temperature in the range of from about 100 to about 140° C. for a time sufficient to remove substantially all of the water from the multiply metal impregnated precipitate, preferably for from about 3 to about 8 hours. Thereafter, the multiply metal impregnated precipitate is preferably calcined in the presence of oxygen or air for a time and under conditions sufficient to provide the calcined catalyst. A variety of conditions sufficient to calcine the dried multiply metal impregnated precipitate or dried nickel impregnated precipitate are well known to the ordinarily skilled artisan. In certain more preferred embodiments of the present invention, the dried nickel impregnated precipitate or dried multiply metal impregnated precipitate is calcined at a temperature in the range of from about 400 to about 500° C., preferably for from about 3 to about 8 hours.

In certain embodiments, the invention is directed to methods for upgrading heavy oil fractions, preferably in a well, comprising:

contacting the heavy oil, preferably in a well that produces heavy oil, with a catalyst according to the invention for a time and under conditions sufficient to increase the H/C ratio.

The H/C ratio of the heavy oil fractions may be measured by any number of methods known to the skilled artisan. In certain preferred embodiments, the H/C ratio is measured by elemental analyzer EXETER CE-490.

The upgrading down well may take place in the following fashion. This general upgrading procedure may be employed after a well has been drilled and completed, whether or not the well in currently in production. Prior to introducing the catalyst into the well, it is useful if the well is perforated within the target zones that contain oil. A volume of treatment fluid containing catalyst is calculated, based on a radial volume of usually 7-20 feet surrounded the well bore in the target zone. This volume is calculated for the effective pore volume based on the rock reservoir porosity. To pump the fluid into the well, it is advantageous to use a coiled tubing that runs through the well head and into position near the front of the perforations of target zone (pay zone) in the reservoir. Then, the fluid containing catalyst is injected or squeezed into the well by a capillary string or through use of a coiled tube and flows through the perforations into the target zones at a pressure higher than the formation pressure. Other methods are recognized by the skilled artisan. As used herein, the term "coiled tubing" or "coiled tube" refers to a continuous length of steel or composite tubing that is flexible enough to be wound on a large reel for transportation. The coiled tubing unit is typically composed of a reel with the coiled tubing, an injector, control console, power supply and well-control stack. The coiled tubing is injected into the existing production string, unwound from the reel and inserted into the well". Target formations (called pay zones or target zones) absorb the fluid as it is being injected. The pumping rate is set so as not to reach or exceed the formation fracture pressure, a characteristic defined by the geology of the individual well. Once the volume of the fluid has been squeezed into the formation, injection ceases and the well is maintained for a period of time ("soaking") in a static condition (no oil removal) to allow the desired reaction to take place. An exemplary time for "soaking" is overnight. During this time, the catalyst is in contact with the crude oil in the formation at the temperature and pressure that are defined by the well itself. For example, the Chichimene well temperature is about 80° C. and formation pressure is about 1500 PSI. After sufficient time has been allowed for the soaking, the well is reopened and fluids from the target zones (pay Zone) begin to flow back to the surface. In certain preferred embodiments, the well is retreated with additional catalyst after a time, preferably from about a few months after the most recent treatment to about a year, or even more after the most recent treatment with the nanocatalyst of the present invention.

In some preferred embodiments of the methods described herein, the heavy oil fraction contacting with catalyst further comprises contacting with a hydrogen transfer agent. Exemplary hydrogen transfer agents include alcohols or donor solvents, more preferably 1,2,3,4-tetrahydronaphthalene.

In certain more preferred embodiments, the invention is directed to upgraded heavy oil fractions, preferably those produced in a heavy oil producing well, such fractions produced by the methods of the present invention.

The disclosures of each of the foregoing documents are hereby incorporated herein by reference, in their entireties.

The present invention is further described in the following examples. Excepted where specifically noted, the examples are actual examples. These examples are for illustrative purposes only, and are not to be construed as limiting the appended claims.

EXPERIMENTAL SECTION

Examples of the Present Invention

Example 1 (a) Synthesis of Alumina Nanoparticles

An alumina useful in making a catalyst of the present invention was provided in the following manner. Commercially available pure aluminum powder (54 g, 99.2% Al) was dissolved in 270 mL of 50% sodium hydroxide solution at 92° C. After the aluminum dissolved, the solution was allowed to cool to room temperature and filtered. The sodium aluminate was slowly precipitated from solution by adding 30 g of ethyl alcohol and 100 g of distilled water to the solution with gently stirring with slow introduction of gaseous $CO_2$ was slowly bubbled into the solution at room temperature over with gentle stirring while the pH was monitored. After 40 minutes, the solution reached a pH of approximately 8.5. At this point, the introduction of gaseous $CO_2$ was terminated. The resulting precipitate was separated from the mother liquor by filtration and rinsed two times with distilled water until the washes attained a pH 7.0-7.5. The washed sodium aluminate precipitate was dried by heating for 90 minutes in a muffle furnace at 120° C. ($Na_2O/Al_2O_3$ ratio of sodium aluminate obtained was lower than 1.2).

(b) Alternate Synthesis of Alumina Nanoparticles

An alumina useful in making a catalyst of the present invention was provided in the following manner. Commercially available aluminum hydroxide powder (Purity 99.5%, 158 g) was dissolved in 270 mL of 30% sodium hydroxide solution at 92° C. After the aluminum dissolved, the solution was allowed to cool to room temperature and filtered. The sodium aluminate was slowly precipitated from solution by adding 30 g of ethyl alcohol and 100 g of distilled water to the solution with gently stirring with slow introduction of gaseous $CO_2$ was slowly bubbled into the solution at room temperature over with gentle stirring while the pH was monitored. After 40 minutes, the solution reached a pH of approximately 8.5. At this point, the introduction of gaseous $CO_2$ was terminated. The resulting precipitate was separated from the mother liquor by filtration and rinsed two times with distilled water until the washes attained a pH 7.0-7.5. The washed sodium aluminate precipitate was dried by heating for 90 minutes in a muffle furnace at 120° C. ($Na_2O/Al_2O_3$ ratio of sodium aluminate obtained was lower than 1.2).

(c) Synthesis of Supported Nickel Oxide Nano Particles on Alumina Nanoparticles

The dried sodium aluminate precipitate (100 g) from Step (a) ["alumina source"] was impregnated with 4 grams of a 5% by weight aqueous nickel nitrate $Ni(NO_3)_2$ solution for 3 hours using the incipient wetness technique. The nickel wetted precipitate was dried at 120° C. for 6 hours and then calcinated at 450° C. for 6 hours. Samples of calcinated product (supported nanocatalyst) were characterized by $N_2$ adsorption at −196° C. and X-ray diffraction (XRD). Nitrogen adsorption isotherms were obtained with an Autosorb-1 from Quantacrome after outgassing samples overnight at 140° C. under high vacuum ($10^{-6}$ mbar). Surface area ($S_{BET}$) values were calculated using the model of Brunauer, Emmet and Teller (BET). X-Ray Diffraction patterns were recorded with a Philips PW1710 diffractometer using Cu Kα radiation to characterize the catalyst and measure particle size. Results are shown in Table 1.

TABLE 1

Surface Characteristics of Support Nanoparticles and Supported Nickel Oxide on Alumina Nanoparticles

| Material | $S_{Bet}$ ($m^2$/g) | $d_{p-Al}$ (nm) | $d_{p-NiO}$ (nm) |
|---|---|---|---|
| Alumina (Al) | 123.2 | 35 ± 4 | — |
| AlNi (from 5% sol.) | 69.9 | 35 ± 4 | 16 |
| AlNi (from 15% sol.) | 17.9 | 35 ± 4 | 29 |

(d)

The dried sodium aluminate precipitate (100 g) from Step (a) ["alumina source"] was impregnated with 4 grams of a 15% by weight aqueous nickel nitrate $Ni(NO_3)_2$ solution for 3 hours using the incipient wetness technique. The nickel wetted precipitate was dried at 120° C. for 6 hours and then calcinated at 450° C. for 6 hours. Samples of calcinated product (supported nanocatalyst) were characterized by $N_2$ adsorption at −196° C. and X-ray diffraction (XRD). Nitrogen adsorption isotherms were obtained with an Autosorb-1 from Quantacrome after outgassing samples overnight at 140° C. under high vacuum ($10^{-6}$ mbar). Surface area ($S_{BET}$) values were calculated using the model of Brunauer, Emmet and Teller (BET). X-Ray Diffraction patterns were recorded with a Philips PW1710 diffractometer using Cu Kα radiation to characterize the catalyst and measure particle size. Results are shown in Table 1.

(e) Asphaltenes Adsorption Experiments

Figure 5:
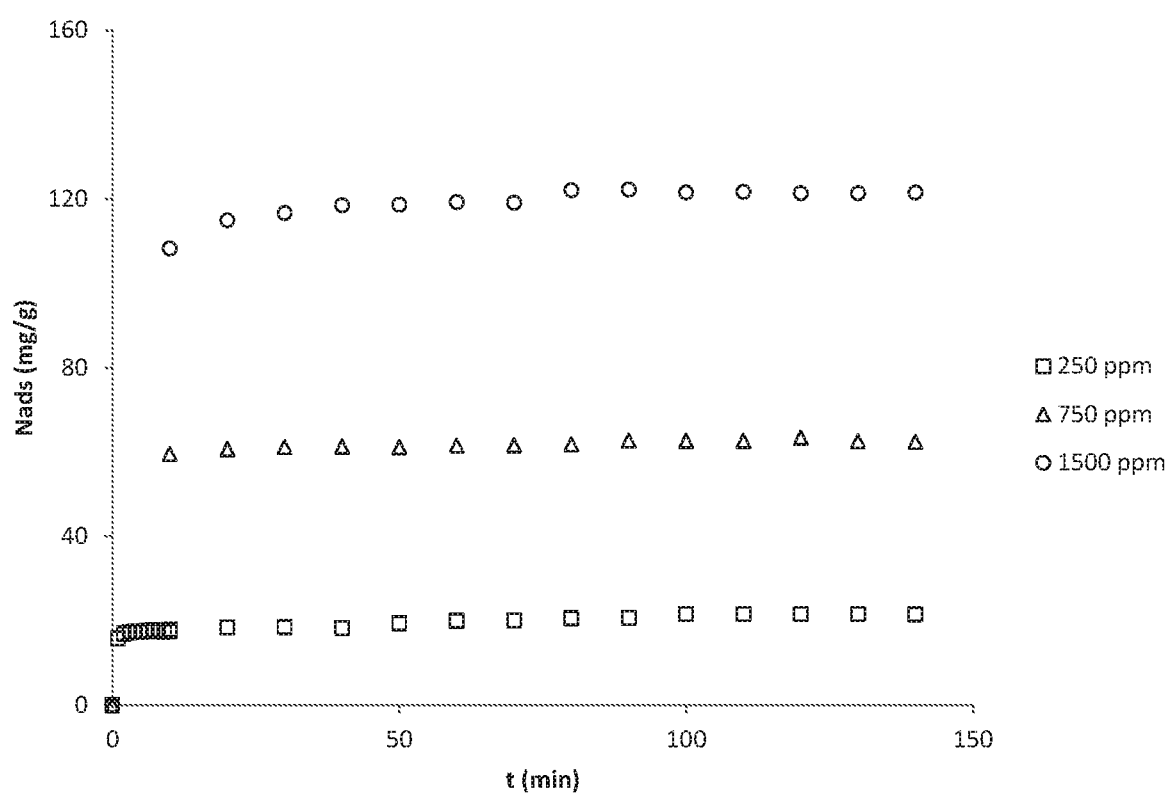
FIG. 5 shows the amount of asphaltene adsorbed on alumina versus time for different initial concentrations of asphaltenes.
Figure 6:
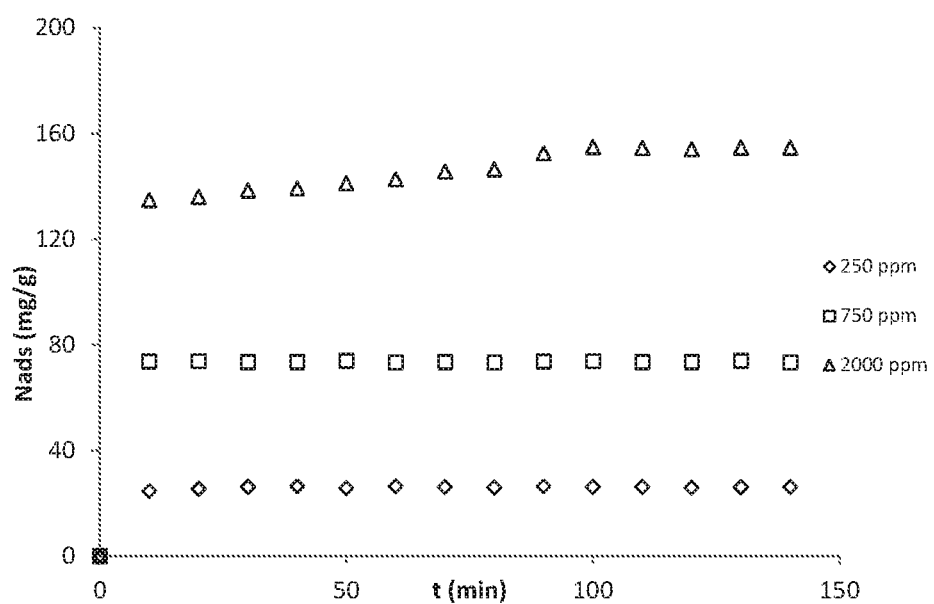
FIG. 6 shows the amount of asphaltene adsorbed on AlNi (5%) versus time for different initial concentrations of asphaltenes.
Figure 7:
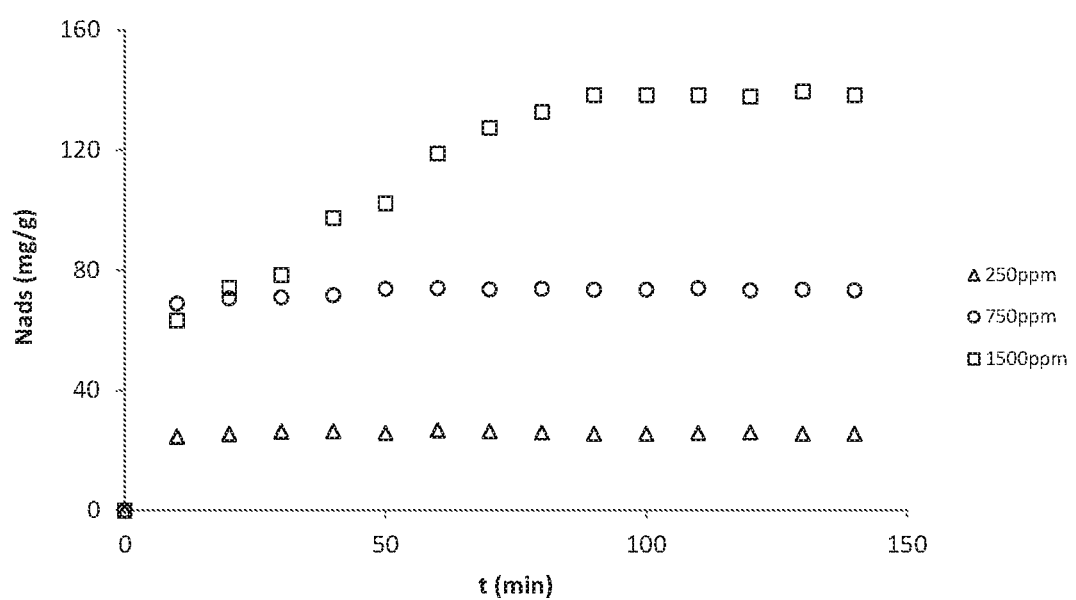
FIG. 7 shows the amount of asphaltene adsorbed on AlNi (15%) versus time for different initial concentrations of asphaltenes.
Figure 8:
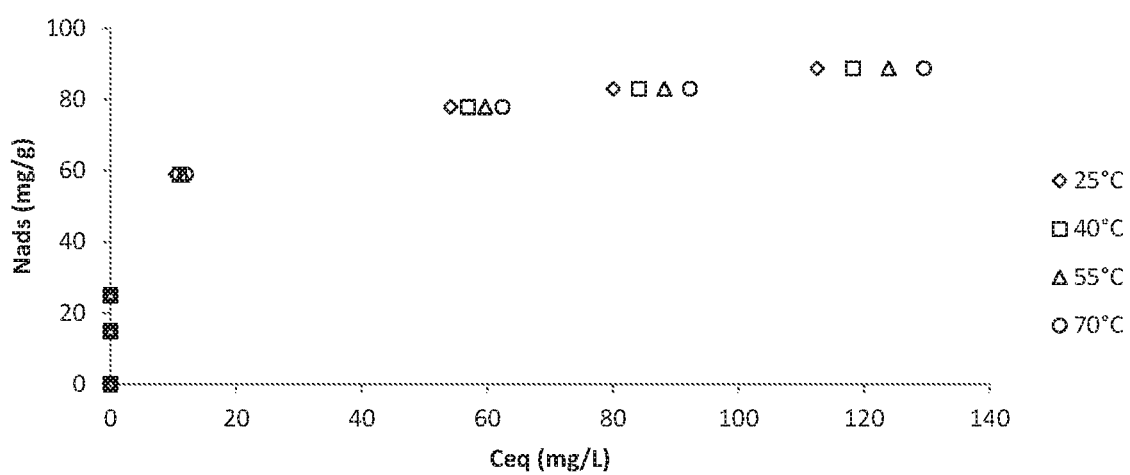
FIG. 8 shows the asphaltene sorption isotherm at a variety of temperatures for an alumina nanoparticle catalyst according to the present invention having nickel oxide and Palladium nanoparticle loadings (Pd0.5/Ni5/Al).
Figure 9:
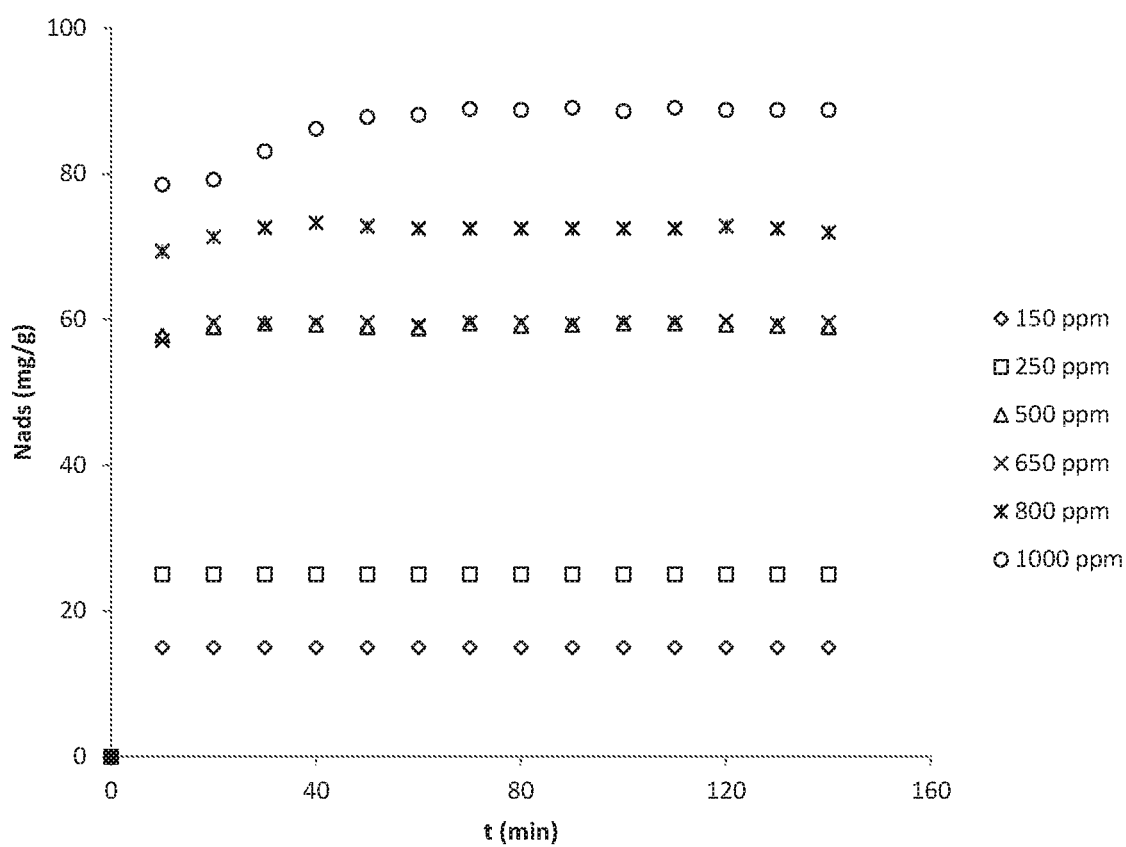
FIG. 9 shows the amount of asphaltene adsorbed on Pd0.5/Ni5/Al versus time for different initial concentrations of asphaltenes.

A calibration curve of UV absorbance versus asphaltene concentration at 400 nm was constructed from the prepared solutions with known concentrations. Toluene was used as solvent for dilution of the asphaltenes, and for the blank in calibration curve construction. To asphaltene solutions of constant volume (10 mL) was added a constant amount (100 mg) of nanoparticles of the supported catalyst containing nickel oxide nanoparticles on alumina nanoparticles obtained in previous step (b) or (c) or a comparison sample containing alumina nanoparticles (100 mg) as described herein. A sample of each solution was stirred at 200 rpm for 10 hours at each of the following temperatures (25, 40, 55 and 70° C.) and analyzed in order to determine the equilibrium for sorption of the asphaltenes. Measurements were taken periodically to monitor progress toward sorption equilibrium. The results are shown in FIGS. 1 to 4. Sorption analysis of asphaltene concentration measurements indicated that one hour was sufficient time to achieve the thermodynamic sorption equilibrium. To determine kinetic parameters, the amount of asphaltenes adsorbed was calculated from concentration measurements for a range of asphaltene concentrations (250, 750, 1500 and 2000 mg/L initial concentrations) at different times as shown in FIGS. 5 to 6. The results indicate that equilibrium is reached more quickly at lower initial concentrations (2 min for calcinated Alumina, AlNi 5% nanocatalyst[1], and AlNi 15% nanocatalyst[2] at 250 and 750 mg/L asphaltene initial concentrations). In contrast, equilibrium is attained after 80 minutes for higher initial asphaltene concentrations (80 minutes for AlNi 5% nanocatalyst, and AlNi 15% nanocatalyst at 1500 and 2000 mg/L asphaltene initial concentrations, respectively).

[1]Catalyst prepared in Example 1, step (b).
[2]Catalyst prepared in Example 1, step (c).

Example 2

Preparation of dried sodium aluminate precipitate with low sodium content was carried out as in the Example 1 Step (a). The dried sodium aluminate precipitate (100 g) from Step (a) ["alumina source"] was impregnated with 3 grams of a 5% by weight aqueous nickel nitrate $Ni(NO_3)_2$ solution for 3 hours using the incipient wetness technique. The nickel wetted precipitate was dried at 120° C. for 6 hours. Dried sodium aluminate precipitate impregnated with nickel salt (100 g) was impregnated with 0.5 g of a 2% by weight aqueous Palladium nitrate $Pd(NO_3)_2$ solution for 3 hours using the incipient wetness technique. The palladium wetted precipitate was dried at 120° C. for 6 hours and then calcinated at 550° C. for 6 hours. Samples of calcinated bimetallic oxide product (supported nanocatalyst referred as Pd0.5/Ni5/Al) were characterized by $N_2$ adsorption at –196° C. and X-ray diffraction (XRD). Nitrogen adsorption isotherms were obtained with an Autosorb-1 from Quantacrome after outgassing samples overnight at 140° C. under high vacuum ($10^{-6}$ mbar). Surface area ($S_{BET}$) values were calculated using the model of Brunauer, Emmet and Teller (BET). X-Ray Diffraction patterns were recorded with a Philips PW1710 diffractometer using Cu Kα radiation to characterize the catalyst and measure particle size such size was 35 nm. Results of kinetics and isotherm analyses are shown below:

Example 3

Heavy oil from the San Vicente oilfield in Colombia was upgraded in the following manner. In a 1500 mL stainless-steel batch reactor 200 g extra-heavy oil, 67 mL prepared 1% wt. aqueous sodium chloride and nanocatalyst (5000 ppm of the supported catalyst containing nickel oxide nanoparticles on alumina nanoparticles obtained in Example 1 (labeled as AlNi (15%)), the 5000 ppm based on the weight of heavy oil. The air above the reaction mixture was replaced with water steam in order to evacuate the air in headspace head of the vessel. The reaction mixture was heated to 300° C. and a relative pressure at temperature of 300 bar in the reactor. The temperature was maintained for 6 hours. The reaction mixture was cooled to room temperature, allowing the water and oil to separate. The water was drained from the bottom of the reactor. The oil remaining in the reactor was removed and analyzed for any upgrading. With respect to the original crude oil, the viscosity of the upgraded sample was reduced approximately 90% by the catalytic thermal cracking reaction. Additionally the API gravity of the original oil was improved from 8 API gravity degrees to 19 API gravity degrees. The API Gravity was measured by ASTM D287 (Hydrometer Method).

Example 4

Samples of asphaltenes from the crude oil were isolated by following a well known procedure. (See Kokal, S. L., J. Najman, S. G. Sayegh, and A. E. George, "Measurement and Correlation of Asphaltene Precipitation from Heavy Oils by Gas Injection," *J. Can. Petrol. Technol.*, 31, 24 (1992). An excess of n-heptane (99% Sigma Aldrich) was added to the crude oil from La Hocha oilfield in Colombia in a volume ratio of 40:1. The mixture was sonicated for 2 hours at 25° C. and further stirred at 300 rpm for 20 hours. The precipitated fraction (10%) was isolated by filtration using a 8 μm Whatman filter paper and washed with n-heptane at a ratio of 4/1 (g/mL). The precipitated fraction containing asphaltenes was added to n-heptane, and the mixture was centrifuged at 5000 rpm for 15 minutes and left to rest for 24 hours. The cake was washed with n-heptane several times until the color of the asphaltenes became shiny black. The sample was dried in a vacuum oven at 25° C. for 12 hours. The obtained asphaltene sample was homogenized in a mortar. The homogenized asphaltenes were dissolved in toluene for preparing a stock solution at 3000 mg/L. Solutions with different concentrations (150, 250, 400, 750, 1000, 1500 and 2000 mg/L) were prepared from the stock solution. The asphaltene adsorption test to evaluate adsorption on Nickel oxide nanoparticles supported on alumina nanoparticles was performed following same protocol described in Example 1, step (e).

Catalytic steam gasification of adsorbed asphaltenes on nanoparticle catalysts was evaluated using a simultaneous thermogravimetric analysis/differential scanning calorimetry (TGA/DSC) analyzer (SDT Q600, TA Instruments, Inc., New Castle, Del.). The instrument had a horizontal beam design that allowed flow of gas parallel to the beam as well as above the sample. The system was also equipped with an outlet close to the sample for steam injection. A sample of each nanocatalyst (similarly prepared to the procedure outlined in Example 1) having approximately 10 mg asphaltenes adsorbed thereon was tested. The same procedure was performed with 10 mg of pure asphaltenes for comparison. The amount of sample employed was chosen to avoid diffusion limitations. Gasification was performed by first purging the system with argon (Ar) at a flow rate of 500 cm3/min for 10 minutes, then decreasing the flow rate to 100 cm3/min, and maintaining this flow throughout the experiment. After the system was purged with argon (Ar) at a flow rate to 100 cm3/min for 20 minutes at room temperature, the temperature was abruptly raised to 150° C. At the same time, H$_2$O (g) was introduced to the system at a flow rate of 6.30 cm3/min. This flow rate allowed the steam to be present above the sample in excess. The temperature of the system was increased at a of rate 5° C. per minute until a temperature of 800° C. was achieved, while recording mass changes in the sample using thermogravimetric analysis/differential scanning calorimetry (TGA/DSC) analyzer (SDT Q600, TA Instruments, Inc., New Castle, Del.). The mass changes are indicative of the initiation and propagation of the cracking gasification reaction.

Thermal catalytic cracking of asphaltenes extracted from extra heavy oil in presence of nickel oxide nanoparticles catalyst supported on alumina nanoparticles was shown to be effective. As a result, with respect to the original asphaltenes, the catalytic cracking temperature of the asphaltenes in the presence of the supported catalyst containing nickel oxide nanoparticles on alumina nanoparticles obtained in Example 1c (AlNi1 (5%)) and Example 1d (AlNi1 (15%)) was approximately 300° C. and 220° C., respectively, as compared with a cracking temperature for asphaltenes of approximately 540° C. in the absence of catalyst. Table 2 show cracking temperatures and the enhancement observed with the supported nanoparticles catalyst.

TABLE 2

Cracking Temperatures of Asphaltenes

| Material | T (° C.)-Cracking |
|---|---|
| Asphaltene (A) | 540 |
| Asphaltenes + Alumina | 520 |
| Asphaltenes + AlNi5 | 300 |
| Asphaltenes + AlNi15 | 220 |

Example 5

Upgrading of a Heavy Oil with a Bimetallic Oxide Supported Nanocatalyst

Heavy Oil (200 g) from Chichimene-17 (a Columbian oil well producing very heavy oil) was placed into a high pressure stirred autoclave reactor. The Pd0.5/Ni5/Al bimetallic oxide nanocatalyst obtained from Example 2 (5 g) was added with vigorous stirring. The hydrogen donor 1,2,3,4,Tetrahydronaphthalene (20 g, from Merck Chemicals) was placed into the reactor and the reactor was heated to 80° C. with stirring. When the internal temperature of the reactor reached 80° C., the system was pressurized to 1500 psi with hydrogen gas and maintained at this temperature and pressure continued for 6 hours at 80° C. The reaction mixture was allowed to stand at room temperature without additional external cooling for four hours. The treated oil from the reactor was collected for analysis. Feedstock oil (100 g) from Chichimene-17 containing 1,2,3,4,Tetrahydronaphthalene (10 g) and the treated oil from the reactor were analyzed for H/C ratio in elemental analyzer EXETER CE-490. The results are shown in Table 3.

TABLE 3

Properties of Crude and Treated Heavy Oil Feedstock

| | Properties of Chichimene-17 Crude Oil Feedstock | Properties of Upgraded Oil |
|---|---|---|
| Carbon (wt %) | 87.97 | 75.42 |
| Hydrogen (wt %) | 11.32 | 11.87 |
| H/C ratio | 1.53 | 1.87 |

The data support the conclusion that there is less unsaturation in the treated oil, indicating that the heavy oil has been upgraded at a moderate temperature (80° C.) and without the necessity of using steam.

Embodiment 1

A catalyst comprising:
nickel oxide nanoparticles supported on alumina nanoparticles;
wherein the alumina nanoparticle to nickel oxide nanoparticle weight to weight ratio in the catalyst is in a range of from about 80 to about 500.

Embodiment 2

A catalyst according to Embodiment 1, wherein the ratio is in a range of from about 99 to about 400.

Embodiment 3

A catalyst according to Embodiment 1 or 2, wherein the Nickel oxide (NiO) nanoparticles are present in an amount of about 0.2% to about 1% by weight of catalyst as measured by hydrogen adsorption.

Embodiment 4

A catalyst according to any one of Embodiments 1 to 3, wherein the particle size of the nickel oxide nanoparticles or the alumina nanoparticles is less than about 0.1 µm.

Embodiment 5

A catalyst according to Embodiment 4, wherein the particle size of the nickel oxide nanoparticles and the alumina nanoparticles are each less than about 0.1 µm.

Embodiment 6

A catalyst according to any one of Embodiments 1 to 5, wherein the alumina nanoparticles are present in an amount of at least 99% by weight of catalyst.

Embodiment 7

A catalyst according to any one of Embodiments 1 to 6, further comprising nanoparticles of at least one Group VIIIB metal oxide supported on the alumina nanoparticles;
wherein:
the Group VIIIB metal is other than nickel; and
the alumina nanoparticle to Group VIIIB metal oxide nanoparticle weight to weight ratio in the catalyst is in a range of from about 80 to about 500.

Embodiment 8

A catalyst according to any one of Embodiments 1 to 7, further comprising nanoparticles of at least one Group IB metal supported on the alumina nanoparticles;

wherein:
the alumina nanoparticle to Group IB metal nanoparticle weight to weight ratio in the catalyst is in a range of from about 80 to about 500.

Embodiment 9

A process for preparing a catalyst comprising:
nickel oxide nanoparticles supported on alumina nanoparticles; wherein the alumina nanoparticle to nickel oxide nanoparticle weight to weight ratio in the catalyst is in a range of from about 80 to about 500;
said process comprising
dry impregnating an amorphous dried sodium aluminate precipitate with an aqueous solution of a water-soluble nickel salt; and
drying the nickel impregnated precipitate;
wherein the dry impregnating and drying steps are each carried out for a time and under conditions sufficient to provide the dried nickel impregnated precipitate catalyst.

Embodiment 10

A process according to Embodiment 9, wherein the dried nickel impregnated precipitate is calcined in the presence of oxygen or air for a time and under conditions sufficient to provide the calcined catalyst.

Embodiment 11

A process according to Embodiment 9 or 10, wherein the nickel impregnated precipitate is dried at a temperature in the range of from about 100 to about 140° C. for from about 3 to about 8 hours.

Embodiment 12

A process according to Embodiment 10, wherein the dried nickel impregnated precipitate is calcined at a temperature in the range of from about 400 to about 500° C. for from about 3 to about 8 hours.

Embodiment 13

A process according to any one of Embodiments 9 to 12, wherein the nickel salt comprises nickel nitrate, nickel chloride or nickel sulfate.

Embodiment 14

A process according to Embodiment 13, wherein the nickel salt comprises nickel nitrate.

Embodiment 15

A process according to any one of Embodiments 9 to 14, wherein the catalyst further comprises nanoparticles of at least one Group VIIIB metal oxide nanoparticles supported on the alumina nanoparticles;
wherein:
the Group VIIIB metal is other than nickel; and
the alumina nanoparticle to Group VIIIB metal oxide nanoparticle weight to weight ratio in the catalyst is in a range of from about 80 to about 500; said process further comprising:
dry impregnating the dried nickel impregnated precipitate with an aqueous solution of a water-soluble Group VIIIB metal salt;
drying the nickel and Group VIIIB metal impregnated precipitate; and
calcining the dried nickel and Group VIIIB metal impregnated precipitate in the presence of oxygen or air;
wherein:
each of the dry impregnating, drying, and calcining are carried out for a time and under conditions sufficient to provide the calcined catalyst.

Embodiment 16

A process according to any one of Embodiments 9 to 15, wherein the catalyst further comprises nanoparticles of at least one Group IB metal supported on the alumina nanoparticles;
wherein:
the alumina nanoparticle to Group IB metal nanoparticle weight to weight ratio in the catalyst is in a range of from about 80 to about 500;
said process further comprising:
dry impregnating the dried nickel impregnated precipitate with an aqueous solution of a water-soluble Group IB metal salt;
drying the nickel and Group IB metal impregnated precipitate; and
calcining the dried nickel and Group IB metal impregnated precipitate in the presence of oxygen or air;
wherein:
each of the dry impregnating, drying, and calcining are carried out for a time and under conditions sufficient to provide the calcined catalyst.

Embodiment 17

A catalyst prepared by the process of any one of Embodiments 9 to 16.

Embodiment 18

A method for upgrading heavy oil fractions in a well, comprising:
contacting the heavy oil in a well producing heavy oil with a catalyst according to any one of Embodiments 1 to 8, for a time and under conditions sufficient to increase the H/C ratio.

Embodiment 19

A method according to Embodiment 18 further comprising a hydrogen transfer agent.

Embodiment 20

A method according to Embodiment 18, wherein the hydrogen transfer agent comprises 1,2,3,4-tetrahydronaphthalene, and wherein the method further optionally comprises the presence of hydrogen gas.

Embodiment 21

An upgraded heavy oil fraction prepared by the process of any one of Embodiments 18 to 20.

When any variable occurs more than one time in any constituent or in any formula, its definition in each occurrence is independent of its definition at every other occurrence. Combinations of substituents and/or variables are permissible only if such combinations result in stable compositions.

It is believed the chemical formulas, abbreviations, and names used herein correctly and accurately reflect the underlying compounds reagents and/or moieties. However, the nature and value of the present invention does not depend upon the theoretical correctness of these formulae, in whole or in part. Thus, it is understood that the formulas used herein, as well as the chemical names and/or abbreviations attributed to the correspondingly indicated compounds, are not intended to limit the invention in any way, including restricting it to any specific form or to any specific isomer.

When ranges are used herein for physical properties, such as molecular weight, or chemical properties, such as chemical formulae, contacting times of reagents, drying and calcining times and temperatures, all combinations and subcombinations of ranges and specific embodiments therein are intended to be included.

The disclosures of each patent, patent application and publication cited or described in this document are hereby incorporated herein by reference, in their entirety.

The invention illustratively disclosed herein suitably may be practiced in the absence of any element which is not specifically disclosed herein. The invention illustratively disclosed herein suitably may also be practiced in the absence of any element which is not specifically disclosed herein and that does not materially affect the basic and novel characteristics of the claimed invention.

Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

What is claimed:

1. A catalyst comprising:
    nickel oxide nanoparticles supported on alumina nanoparticles;
    wherein:
        the alumina nanoparticle to nickel oxide nanoparticle weight to weight ratio in the catalyst is in a range of from about 99 to about 400;
        the particle size of the alumina nanoparticle is in the range of from about 30 to about 100 nanometers;
        the catalyst does not further comprise silver nanoparticles supported on the alumina nanoparticles;
        the alumina nanoparticles are present in an amount of at least 99% by weight of catalyst; and
        the $S_{BET}$ surface area is from about 17 to about 70 m$^2$/g.

2. A catalyst according to claim 1, wherein the nickel oxide (NiO) nanoparticles are present in an amount of about 0.2% to about 1% by weight of catalyst.

3. A catalyst according to claim 2, wherein the nickel oxide (NiO) nanoparticles are present in an amount of about 0.2% to about 0.6% by weight of catalyst.

4. A catalyst according to claim 1, further comprising nanoparticles of at least one Group VIIIB metal oxide supported on the alumina nanoparticles;
    wherein:
        the Group VIIIB metal is selected from the group consisting of Pd and Pt, or combination thereof; and
        the alumina nanoparticle to Group VIIIB metal oxide nanoparticle weight to weight ratio in the catalyst is in a range of from about 99 to about 400.

5. A method for providing an upgraded heavy oil fraction in a well comprising:
    contacting a heavy oil in a well producing the heavy oil with a nanocatalyst according to claim 2 for a time and under intrinsic well temperature conditions sufficient to increase the H/C ratio.

6. A method according to claim 5 further comprising contacting the heavy oil with a hydrogen transfer agent.

7. A method according to claim 6, wherein the hydrogen transfer agent comprises 1,2,3,4-tetrahydronaphthalene.

8. A method according to claim 5, wherein the nickel oxide (NiO) nanoparticles are present in an amount of about 0.2% to about 0.6% by weight of catalyst.

9. A method according to claim 5, wherein the contacting does not exceed the intrinsic fracture pressure of the oil well.

10. A method according to claim 5, wherein, subsequent to said contacting, the well is maintained in a static condition for a period of time before heavy oil removal is initiated.

11. A method according to claim 5, wherein the heavy oil in the well is retreated by contacting with a retreatment nanocatalyst for a time and under intrinsic well temperature conditions sufficient to increase the H/C ratio; said retreatment nanocatalyst comprising:
    nickel oxide nanoparticles supported on alumina nanoparticles;
    wherein:
        the alumina nanoparticle to nickel oxide nanoparticle weight to weight ratio in the catalyst is in a range of from about 99 to about 400;
        the particle size of the alumina nanoparticle is in the range of from about 30 to about 100 nanometers;
        the catalyst does not further comprise silver nanoparticles supported on the alumina nanoparticles;
        the alumina nanoparticles are present in an amount of at least 99% by weight of catalyst; and
        the SBET surface area is from about 17 to about 70 m2/g.

12. A method for providing an upgraded heavy oil fraction in a well comprising: contacting a heavy oil in a well producing the heavy oil with a nanocatalyst catalyst according to claim 4 for a time and under intrinsic well temperature conditions sufficient to increase the H/C ratio.

13. A method according to claim 12 further comprising contacting the heavy oil with a hydrogen transfer agent.

14. A method according to claim 13, wherein the hydrogen transfer agent comprises 1,2,3,4-tetrahydronaphthalene.

15. A method according to claim 12, wherein the nickel oxide (NiO) nanoparticles are present in an amount of about 0.2% to about 1% by weight of catalyst.

16. A method according to claim 15, wherein the nickel oxide (NiO) nanoparticles are present in an amount of about 0.2% to about 0.6% by weight of catalyst.

17. A method according to claim 12, wherein the contacting does not exceed the intrinsic fracture pressure of the oil well.

18. A method according to claim 12, wherein, subsequent to said contacting, the well is maintained in a static condition for a period of time before heavy oil removal is initiated.

19. A method according to claim 12, wherein the heavy oil in the well is retreated by contacting with a retreatment nanocatalyst for a time and under intrinsic well temperature conditions sufficient to increase the H/C ratio; said retreatment nanocatalyst comprising:
    nickel oxide nanoparticles supported on alumina nanoparticles;
    wherein:

the alumina nanoparticle to nickel oxide nanoparticle weight to weight ratio in the catalyst is in a range of from about 99 to about 400;

the particle size of the alumina nanoparticle is in the range of from about 30 to about 100 nanometers;

the catalyst does not further comprise silver nanoparticles supported on the alumina nanoparticles;

the alumina nanoparticles are present in an amount of at least 99% by weight of catalyst; and the SBET surface area is from about 17 to about 70 m2/g.

20. A catalyst consisting essentially of: nickel oxide nanoparticles supported on alumina nanoparticles; and optionally, metal oxide nanoparticles of Pd or Pt, or combination thereof, said metal oxide nanoparticles supported on the alumina nanoparticles; wherein the alumina nanoparticle to nickel oxide nanoparticle weight to weight ratio in the catalyst is in a range of from about 99 to about 400; wherein the catalyst does not further contain silver nanoparticles supported on the alumina nanoparticles; wherein the particle size of the alumina nanoparticle is in the range of from about 30 to about 100 nanometers; and wherein the alumina nanoparticles are present in an amount of at least 99% by weight of catalyst; and the $S_{BET}$ surface area is from about 17 to about 70 m$^2$/g.

21. A catalyst according to claim 20, wherein the catalyst consists essentially of: nickel oxide nanoparticles supported on alumina nanoparticles; and metal oxide nanoparticles of Pd supported on the alumina nanoparticles; wherein the alumina nanoparticle to nickel oxide nanoparticle weight to weight ratio in the catalyst is in a range of from about 99 to about 400; and wherein the particle size of the alumina nanoparticle is in the range of from about 30 to about 100 nanometers.

22. A catalyst according to claim 20, wherein the catalyst consists essentially of: nickel oxide nanoparticles supported on alumina nanoparticles; wherein the alumina nanoparticle to nickel oxide nanoparticle weight to weight ratio in the catalyst is in a range of from about 99 to about 400; and wherein the particle size of the alumina nanoparticle is in the range of from about 30 to about 100 nanometers.

* * * * *